US012318354B2

(12) United States Patent
Chang et al.

(10) Patent No.: US 12,318,354 B2
(45) Date of Patent: Jun. 3, 2025

(54) ELECTRIC MEDICINE GRINDER

(71) Applicant: E-LINK PLASTIC & METAL INDUSTRIAL CO., LTD., New Taipei (TW)

(72) Inventors: Pin-Yang Chang, New Taipei (TW); Yu Chin Hsu, New Taipei (TW)

(73) Assignee: E-LINK PLASTIC & METAL INDUSTRIAL CO., LTD., New Taipei (TW)

( * ) Notice: Subject to any disclaimer, the term of this patent is extended or adjusted under 35 U.S.C. 154(b) by 319 days.

(21) Appl. No.: 18/083,873

(22) Filed: Dec. 19, 2022

(65) Prior Publication Data

US 2024/0197568 A1 Jun. 20, 2024

(51) Int. Cl.
*A61J 7/00* (2006.01)
*A61J 3/02* (2006.01)

(52) U.S. Cl.
CPC ............... *A61J 7/0007* (2013.01); *A61J 3/02* (2013.01)

(58) Field of Classification Search
CPC .. A61J 7/0007; A61J 3/02; A47J 42/26; A47J 42/28; A47J 42/38; A47J 42/46
See application file for complete search history.

(56) References Cited

U.S. PATENT DOCUMENTS

2020/0268208 A1* 8/2020 Abehasera .............. A47J 42/44
2024/0252401 A1* 8/2024 Gregory ................ A61J 7/0007

* cited by examiner

*Primary Examiner* — Mohammed S. Alawadi
(74) *Attorney, Agent, or Firm* — RABIN & BERDO, P.C.

(57) ABSTRACT

An electric medicine grinder includes a storing base and a grinding base detachably connected together, and a grinding assembly and an operating module mounted on the grinding base. The grinding assembly includes a driving motor and a breaking tool. The breaking tool is mounted in a storing recess of the storing base. The operating module is electrically connected with the driving motor, and is configured to provide electric power for operation of the driving motor. Medicines can be ground into powder simply by pressing the starting switch, which is time and labor saving. It is useful to reduce the ground medicine remaining in the storing recess and on the breaking tool. A total amount of medicine taken by the patient is not reduced and no ground medicines would be remained in the electric medicine grinder and mix with the subsequent ground medicines to cause adverse effects to the patient.

16 Claims, 9 Drawing Sheets

ELECTRIC MEDICINE GRINDER

BACKGROUND OF THE INVENTION

1. Field of the Invention

The present invention relates to a medical device for grinding medicine, especially to an electric medicine grinder that is used to process medicines for ease in taking the medicines.

2. Description of the Prior Art(s)

Except traditional Chinese herbal medicine, medicine is normally manufactured as tablets for patients to swallow. However, children or patients with dysphagia have difficulty swallowing some large tablets. Therefore, a medicine grinder is used to grind tablets into powders for easy swallowing.

A conventional medicine grinder includes a grinding base and a grinding head. The grinding base has a recess for storing medicines to be ground and has multiple rough grinding teeth and multiple fine grinding teeth formed on an inner annular surface defined around the recess. The grinding head is detachably assembled to the grinding base and has multiple rough grinding edges and multiple fine grinding edges formed on an outer annular surface of the grinding head. The rough grinding edges of the grinding head correspond in position to the rough grinding teeth of the grinding base. The fine grinding edges of the grinding head correspond in position to the fine grinding teeth of the grinding base. When the grinding head and the grinding base are rotated relatively, the medicines stored in the recess of the grinding base are broken into small particles between the rough grinding edges and the rough grinding teeth and then enter between the fine grinding edges and the fine grinding teeth to be ground into powder.

However, the conventional medicine grinder should be operated manually, which is time consuming and laborious to users. In addition, the broken medicines would be attached to the rough grinding edges, the rough grinding teeth, the fine grinding edges and the fine grinding teeth due to pressure while be ground. Consequently, it is difficult to pour out the ground medicine for taking and is not easy to clean the grinding base and the grinding head. Moreover, a total amount of medicine taken by the patient is reduced and the ground medicine remaining on the grinding base and the grinding head would mix with the subsequent ground medicines to cause adverse effects to the patient.

To overcome the shortcomings, the present invention provides an electric medicine grinder to mitigate or obviate the aforementioned problems.

SUMMARY OF THE INVENTION

The main objective of the present invention is to provide an electric medicine grinder that includes a storing base, a grinding base, a grinding assembly, and an operating module. The storing base has a storing recess formed in a top of the storing base. The grinding base is detachably mounted on the top of the storing base. The grinding assembly is mounted on the grinding base and includes a driving motor and a breaking tool. The driving motor is securely mounted in the grinding base and has a rotating shaft. The breaking tool is assembled to the rotating shaft of the driving motor and is mounted in the storing recess of the storing base. The operating module is mounted in the grinding base, is electrically connected with the driving motor, and is configured to provide electric power for operation of the driving motor.

With the electric medicine grinder, medicines can be ground into powder simply by pressing the starting switch, which is time and labor saving. By grinding the medicine in the storing recess of the storing base with the breaking tool, it is useful to reduce the ground medicine remaining in the storing recess and on the breaking tool. A total amount of medicine taken by the patient is not reduced and no ground medicines would be remained in the electric medicine grinder and mix with the subsequent ground medicines to cause adverse effects to the patient.

Other objectives, advantages and novel features of the invention will become more apparent from the following detailed description when taken in conjunction with the accompanying drawings.

BRIEF DESCRIPTION OF THE DRAWINGS

FIG. 4 is another perspective view of the electric medicine grinder in

FIG. 1;

FIG. 8 is a cross-sectional side view of the electric medicine grinder in

FIG. 1; and

DETAILED DESCRIPTION OF THE PREFERRED EMBODIMENTS

Figure 1:
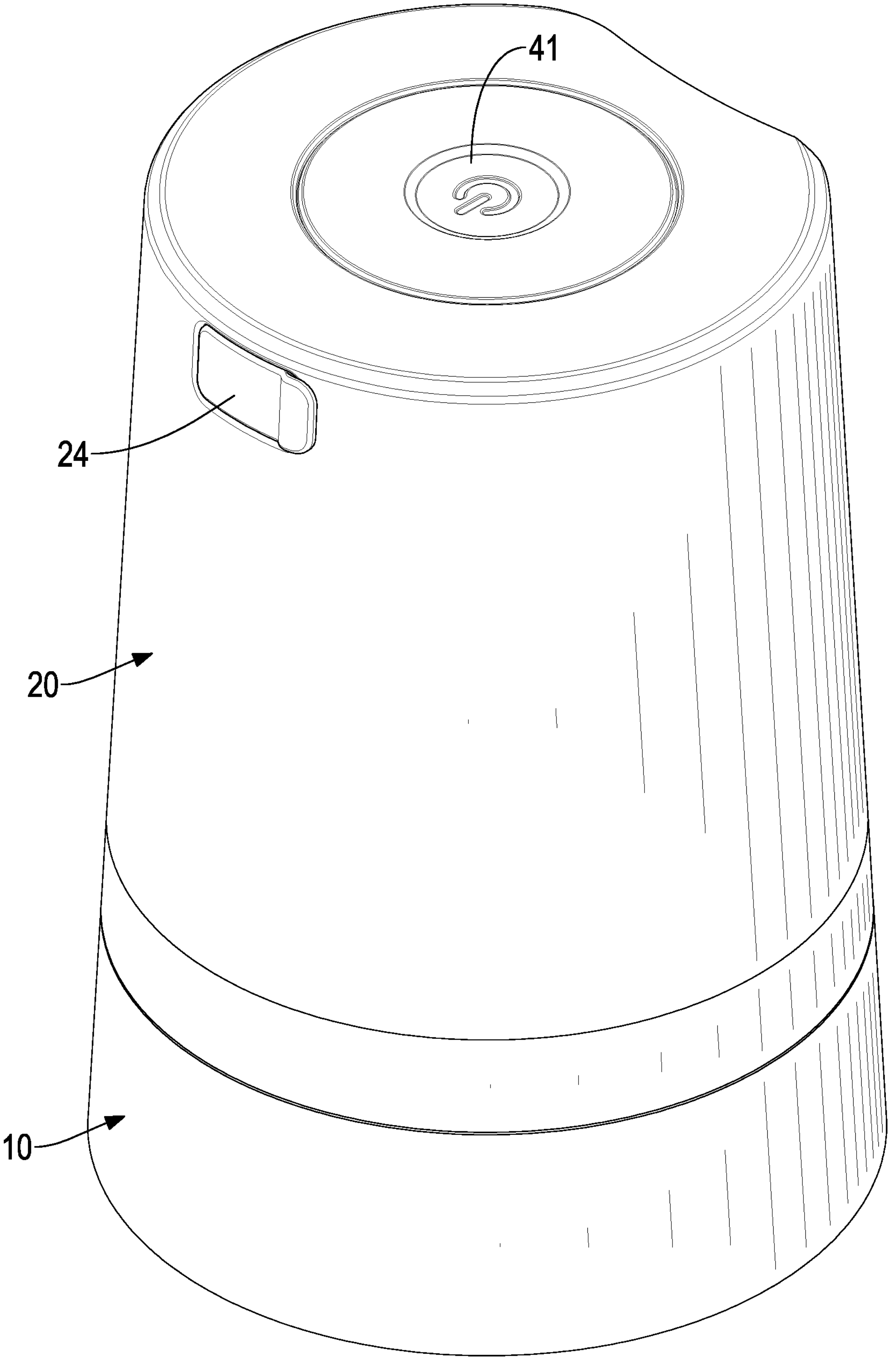
FIG. 1 is a perspective view of an electric medicine grinder in accordance with the present invention.
Figure 3:
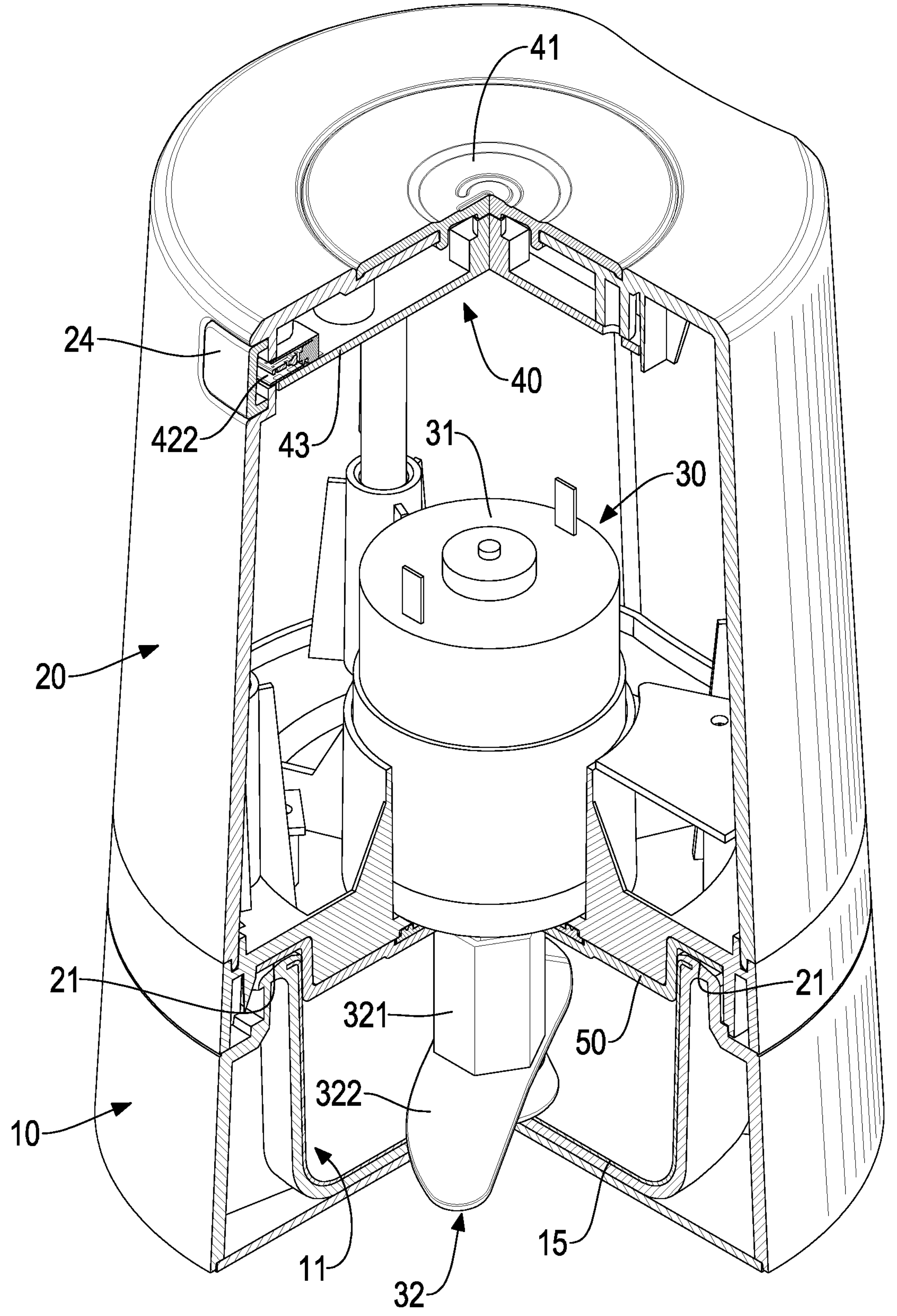
FIG. 3 is a cross-sectional perspective view of the electric medicine grinder in FIG. 1.

With reference to FIGS. 1 and 3, an electric medicine grinder in accordance with the present invention comprises a storing base 10, a grinding base 20, a grinding assembly 30, a sealing gasket 50, and an operating module 40.

Figure 6:
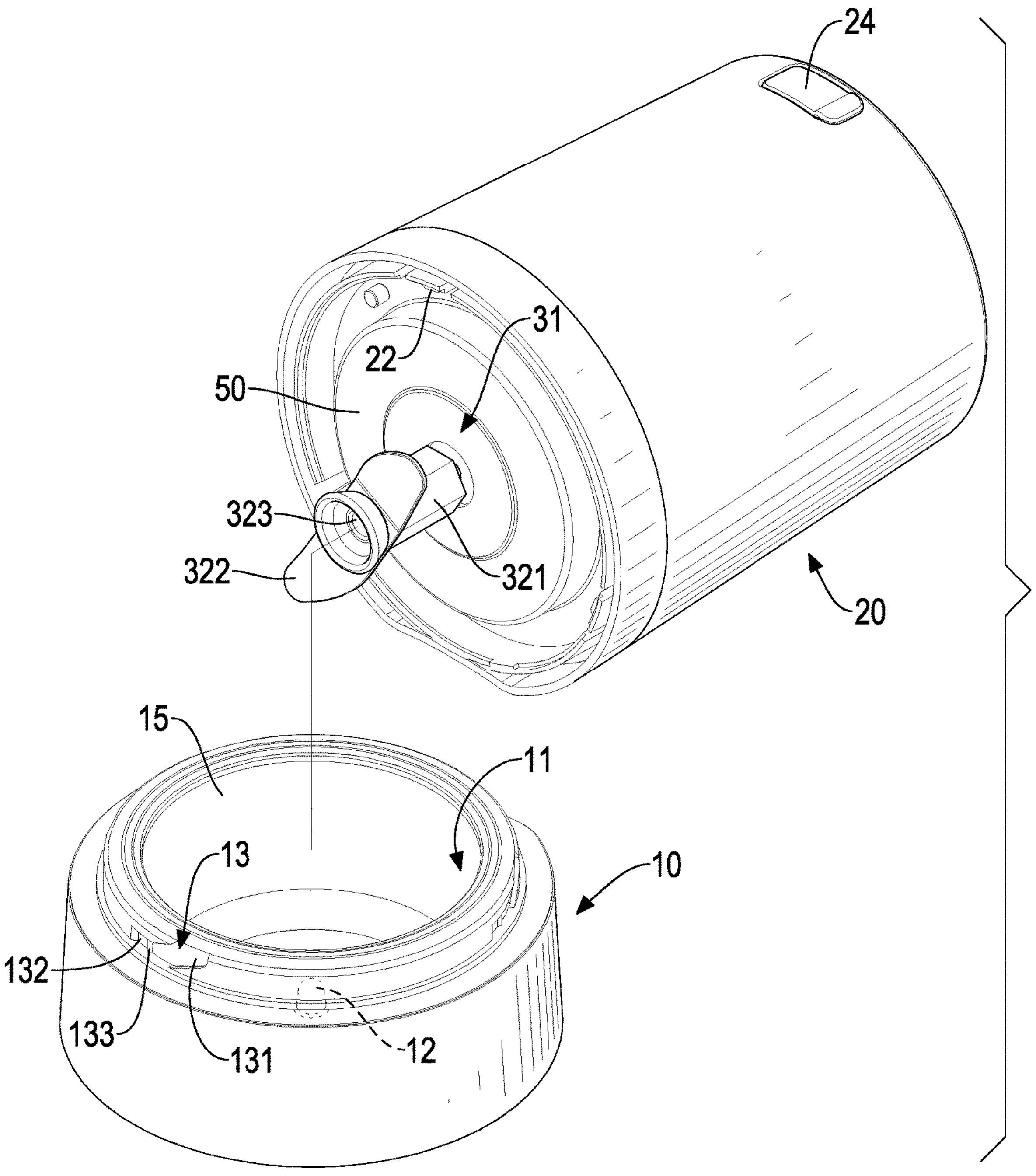
FIG. 6 is an exploded perspective view of the electric medicine grinder in FIG. 1.

With further reference to FIG. 6, the storing base 10 has a storing recess 11, an inner bottom, a positioning protrusion 12 and multiple engaging grooves 13. The storing recess 11 is formed in a top of the storing base 10 and is configured to store medicines to be ground or the ground medicines. The inner bottom of the storing base 10 is defined in the storing recess 11. The positioning protrusion 12 is formed on the inner bottom of the storing base 10. The engaging grooves 13 is separately formed in an outer annular surface of the storing base 10. Each of the engaging grooves 13 is elongated and has an insertion section 131, an extension section 132 and an engaging protrusion 133. The insertion section 131 of the engaging groove 13 extends toward and is formed through the top of the storing base 10. The extension section 132 of the engaging groove 13 extends parallel to the top of the storing base 10. The engaging protrusion 133 is formed in the extension section 132 of the engaging groove 13.

In the preferred embodiment, an inner container 15, which is made of stainless steel, is mounted in the storing base 10 and the storing recess 11 is formed in the inner container 15. By made of stainless steel, the inner container 15 is not abraded while the medicines are being ground.

The grinding base 20 is detachably mounted on the top of the storing base 10 and has a bottom, a mounting recess 21, an inner annular surface and multiple locking protrusions 22. The bottom of the grinding base 20 faces toward the top of the storing base 10. The mounting recess 21 is formed in the bottom of the grinding base 20. The inner annular surface of the grinding base 20 is defined around the mounting recess 21. The locking protrusions 22 are separately formed on the inner annular surface of the grinding base 20 and are movably mounted in the engaging grooves 13 of the storing base 10 respectively.

When assembling the grinding base 20 and the storing base 10, the locking protrusions 22 of the grinding base 20 are moved into the engaging grooves 13 of the storing base 10 from the insertion sections 131 respectively. Then the storing base 10 and the grinding base 20 are rotated relatively to allow each of the locking protrusions 22 to move along the extension section 132 of a corresponding one of the engaging grooves 13. As the locking protrusion 22 is moved across the engaging protrusion 133 and is engaged between the engaging protrusion 133 and an end of the extension section 132 of the corresponding one of the engaging grooves 13, the storing base 10 and the grinding base 20 are securely connected with each other.

Figure 4:
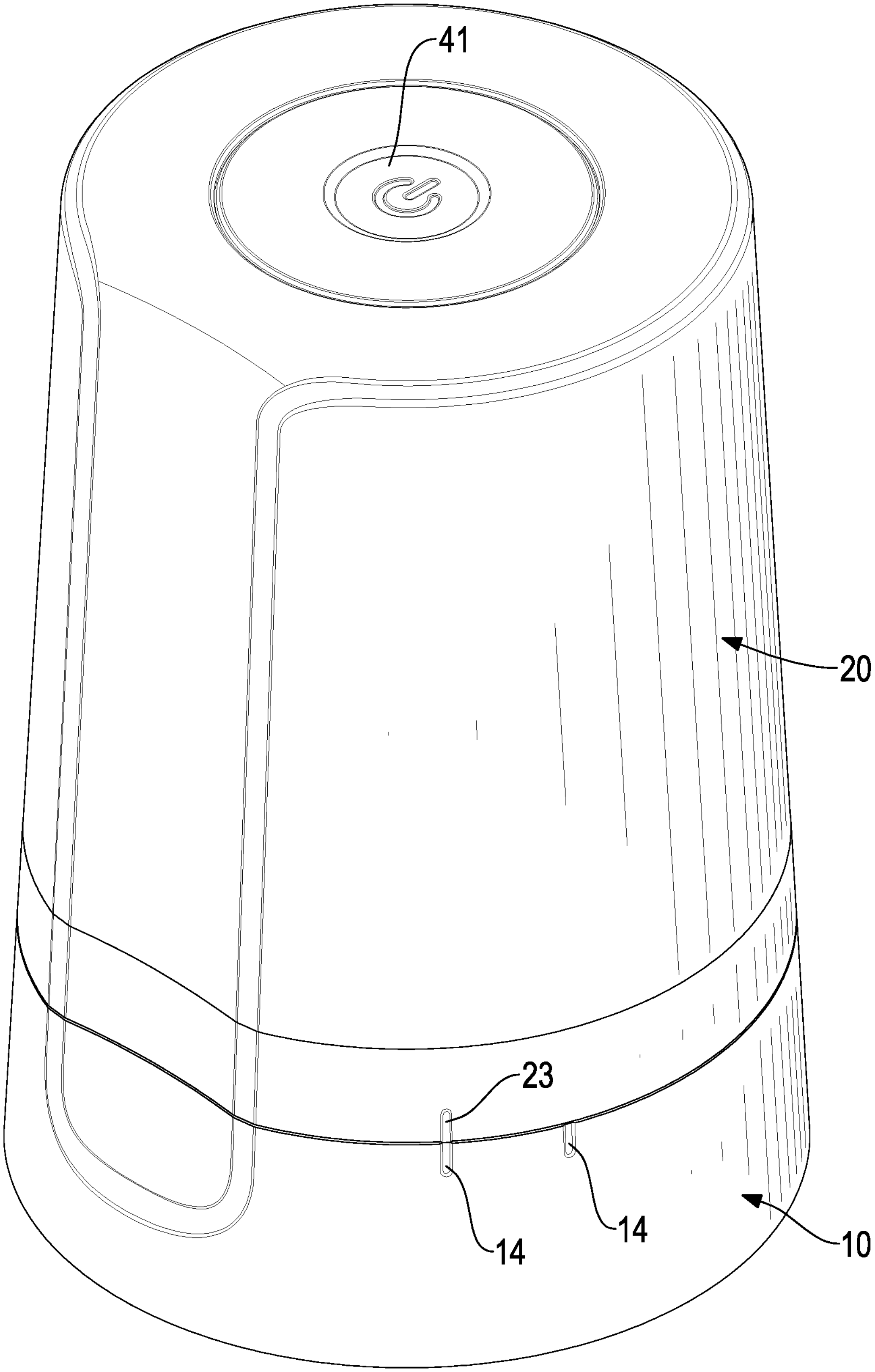

With further reference to FIG. 4, in the preferred embodiment, the storing base 10 further has two aligning notches 14 separately formed the outer annular surface of the storing base 10 and the grinding base 20 further has an aligning notch 23 formed on an outer annular surface of the grinding base 20. When the locking protrusions 22 of the grinding base 20 are disposed in the insertion sections 131 of the engaging grooves 13 of the storing base 10 respectively, the aligning notch 23 of the grinding base 20 aligns with one of the aligning notches 14 of the storing base 10. When each of the locking protrusions 22 of the grinding base 20 is moved to the end of the extension section 132 of the corresponding one of the engaging grooves 13, the aligning notch 23 of the grinding base 20 aligns with the other one of the aligning notches 14 of the storing base 10. A user is able to assemble or disassemble the storing base 10 and the grinding base 20 according to relative positions of the two notches 14 of the storing base 10 and the notch 23 of the storing base 23.

In the preferred embodiment, said multiple engaging grooves 13 includes three engaging grooves 13. The three engaging grooves 13 are disposed on the outer annular surface of the storing base 10 at intervals of 120 degrees. Said multiple locking protrusions 22 includes three locking protrusions 22. The three locking protrusions 22 are disposed on the inner annular surface of the grinding base 20 at intervals of 120 degrees.

With further reference to FIGS. 6 to 9, the grinding assembly 30 is mounted on the grinding base 20 and includes a driving motor 31 and a breaking tool 32. The driving motor 31 is securely mounted in the grinding base 20 and has a rotating shaft 311 protruding from the bottom of the grinding base 20.

The breaking tool 32 is detachably assembled to the rotating shaft 311 of the driving motor 31. When the grinding base 20 is mounted on the storing base 10, the breaking tool 32 is mounted in the storing recess 11 of the storing base 10. The breaking tool 32 has a central shaft 321 and multiple blades 322. The central shaft 321 has a connecting end and a positioning end oppositely defined on the central shaft 321. The connecting end of the central shaft 321 is detachably connected to the rotating shaft 311 of the driving motor 31, such that the breaking tool 32 is able to be driven to rotate by the driving motor 31. A positioning recess 323 is formed in the positioning end of the central shaft 321. The blades 322 are mounted on an outer annular surface of the central shaft 321, are arranged around the central shaft 321, and extend radially. When the grinding base 20 and the storing base 10 are assembled together, the positioning protrusion 12 of the storing base 10 protrudes in the positioning recess 323 on the central shaft 321 of the breaking tool 32, such that the breaking tool 32 is stable while rotating.

Figure 7:
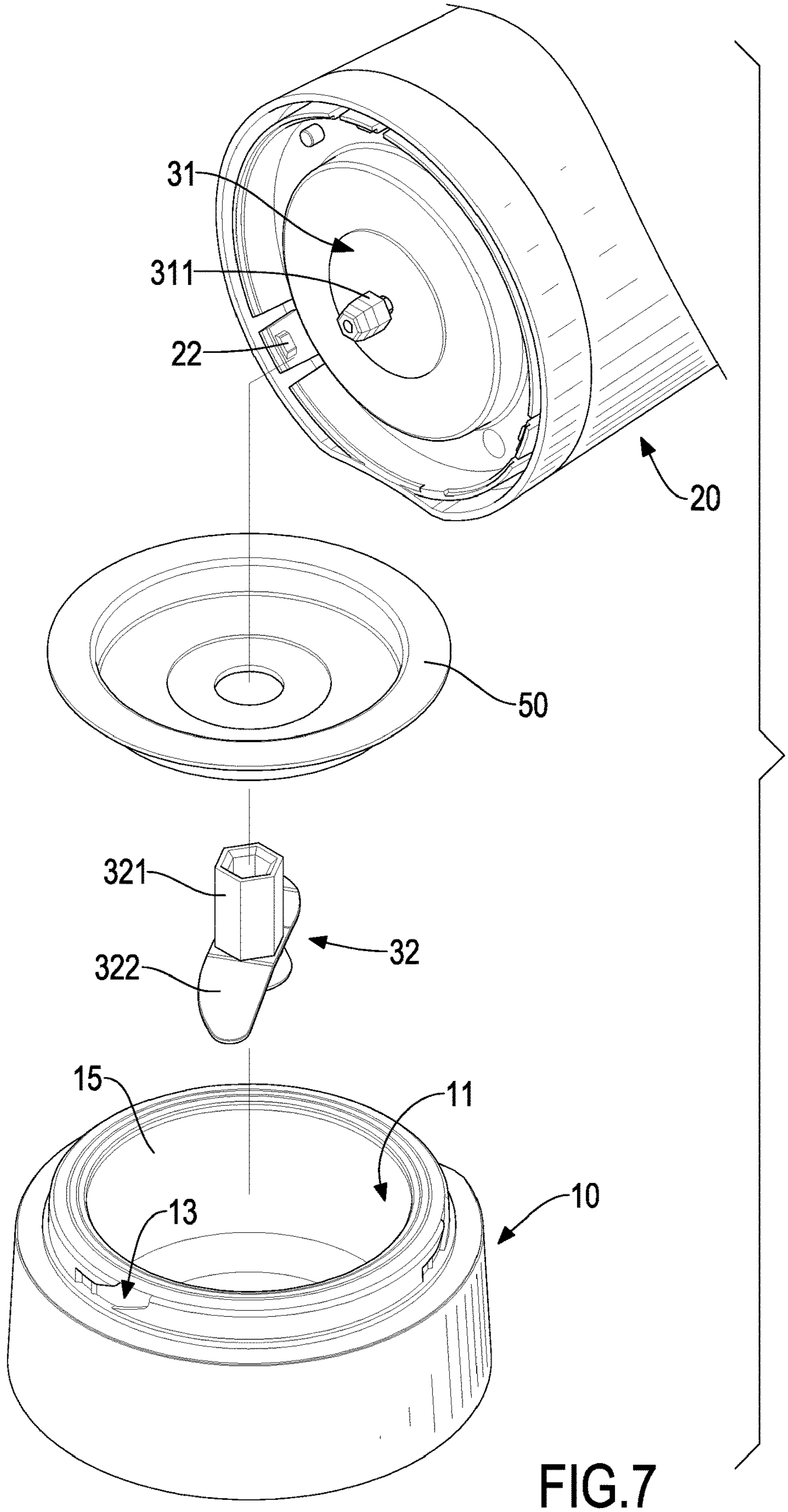
FIG. 7 is an enlarged exploded perspective view of the electric medicine grinder in FIG. 1.
Figure 8:
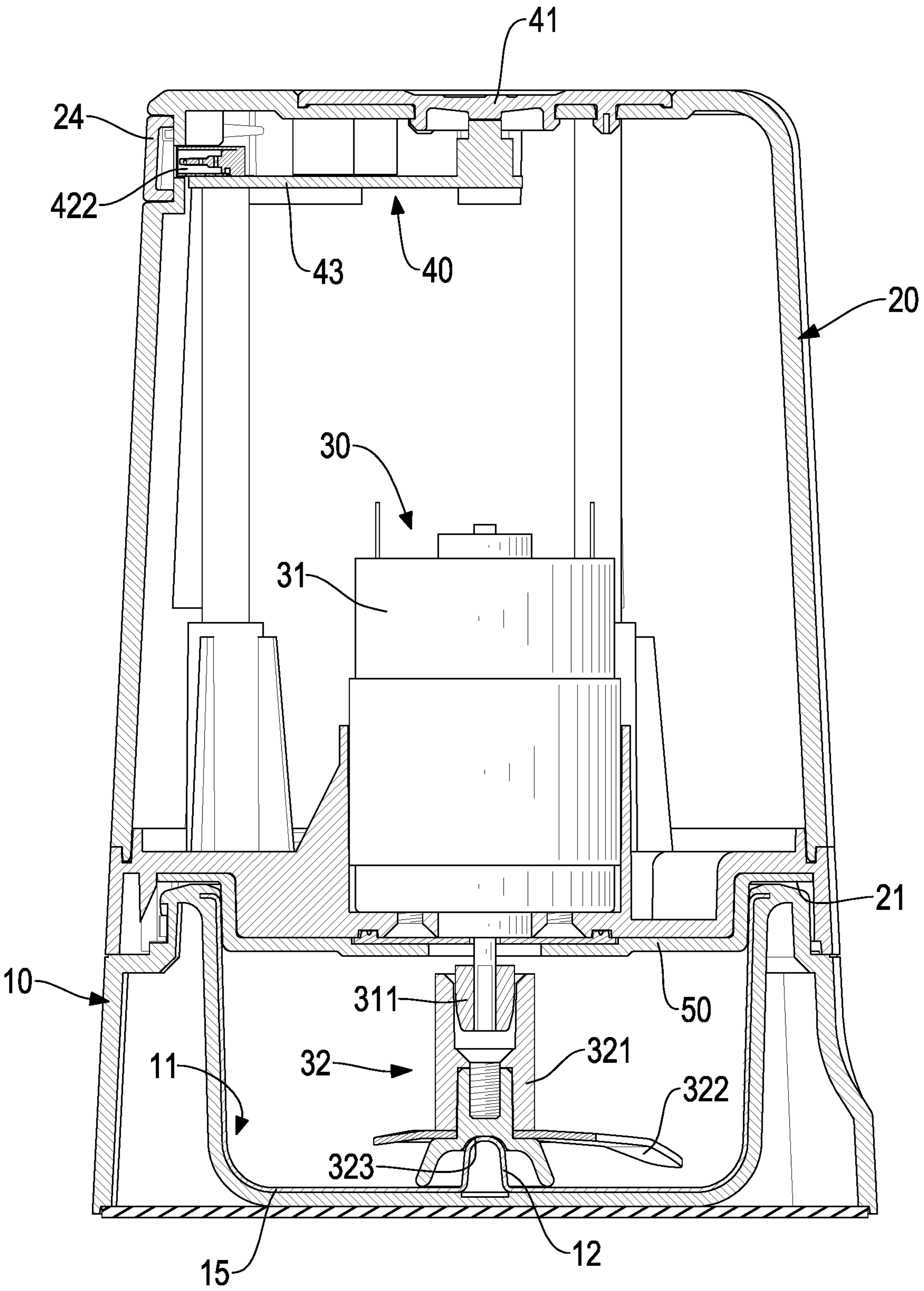
Figure 9:
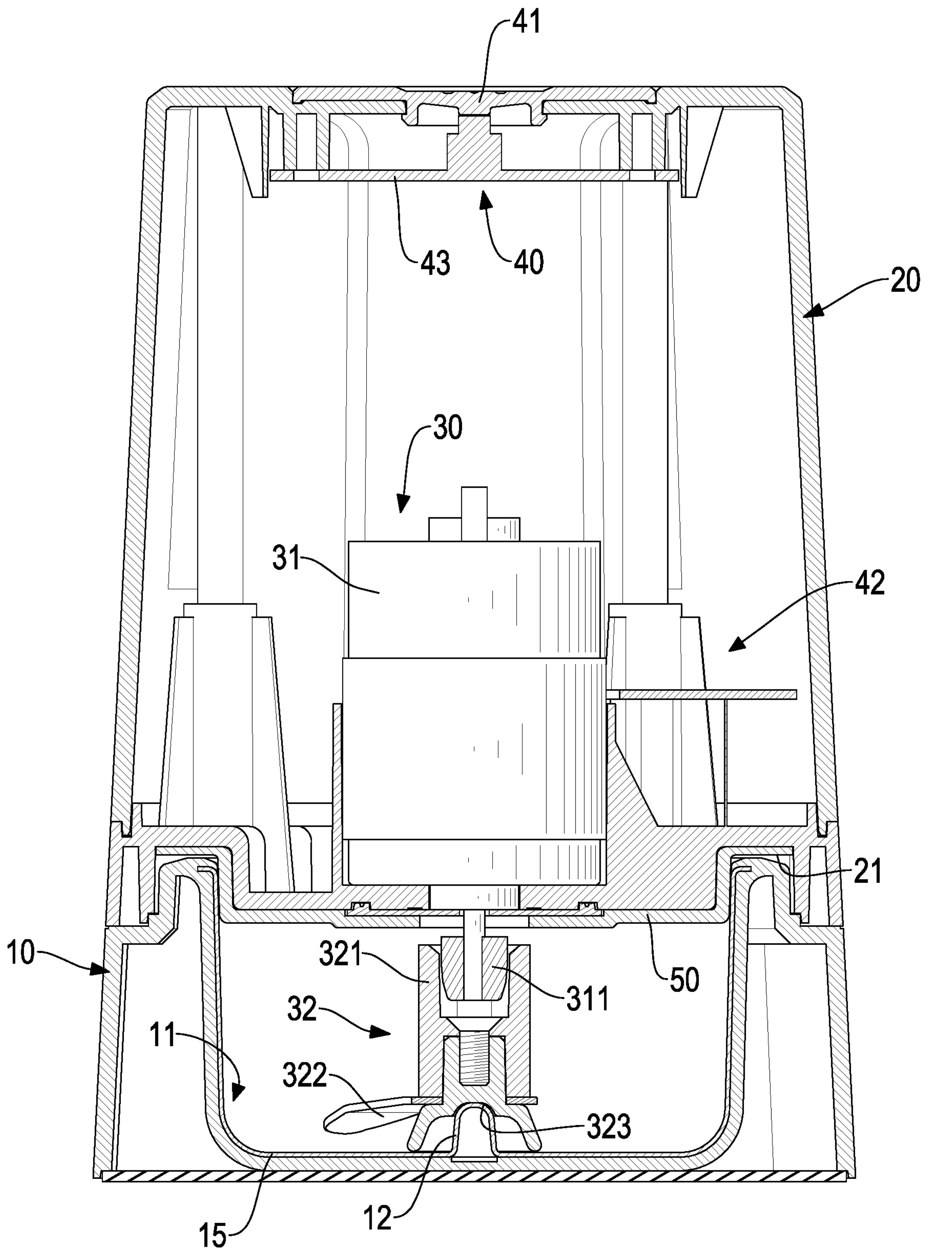
FIG. 9 is another cross-sectional side view of the electric medicine grinder in FIG. 1.

With further reference to FIGS. 3 and 7, the sealing gasket 50 is mounted on the bottom of the grinding base 20. The rotating shaft 311 of the driving motor 31 is mounted through the sealing gasket 50 to be connected with the breaking tool 32. When the grinding base 20 and the storing base 10 are assembled together, the sealing gasket 50 is held between the storing base 10 and the grinding base 20. Thus, the sealing gasket 50 seals an opening of the storing recess 11 of the storing base 10, so as to prevent the ground medicines from random scattering while being ground.

Figure 2:
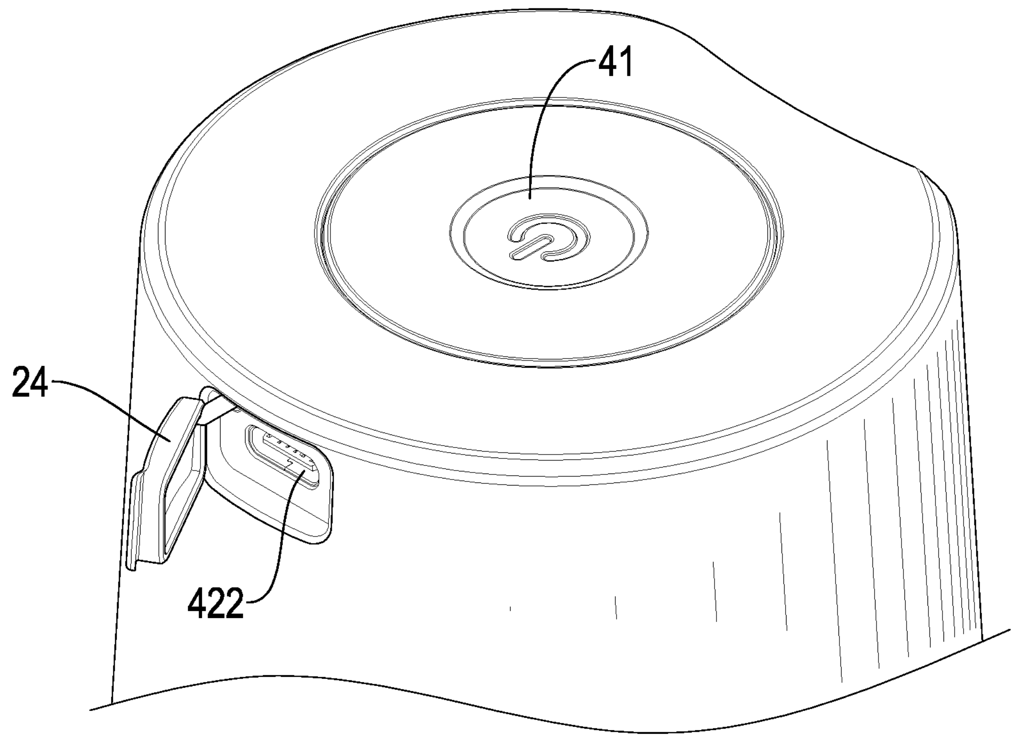
FIG. 2 is an enlarged perspective view of the electric medicine grinder in FIG. 1.
Figure 5:
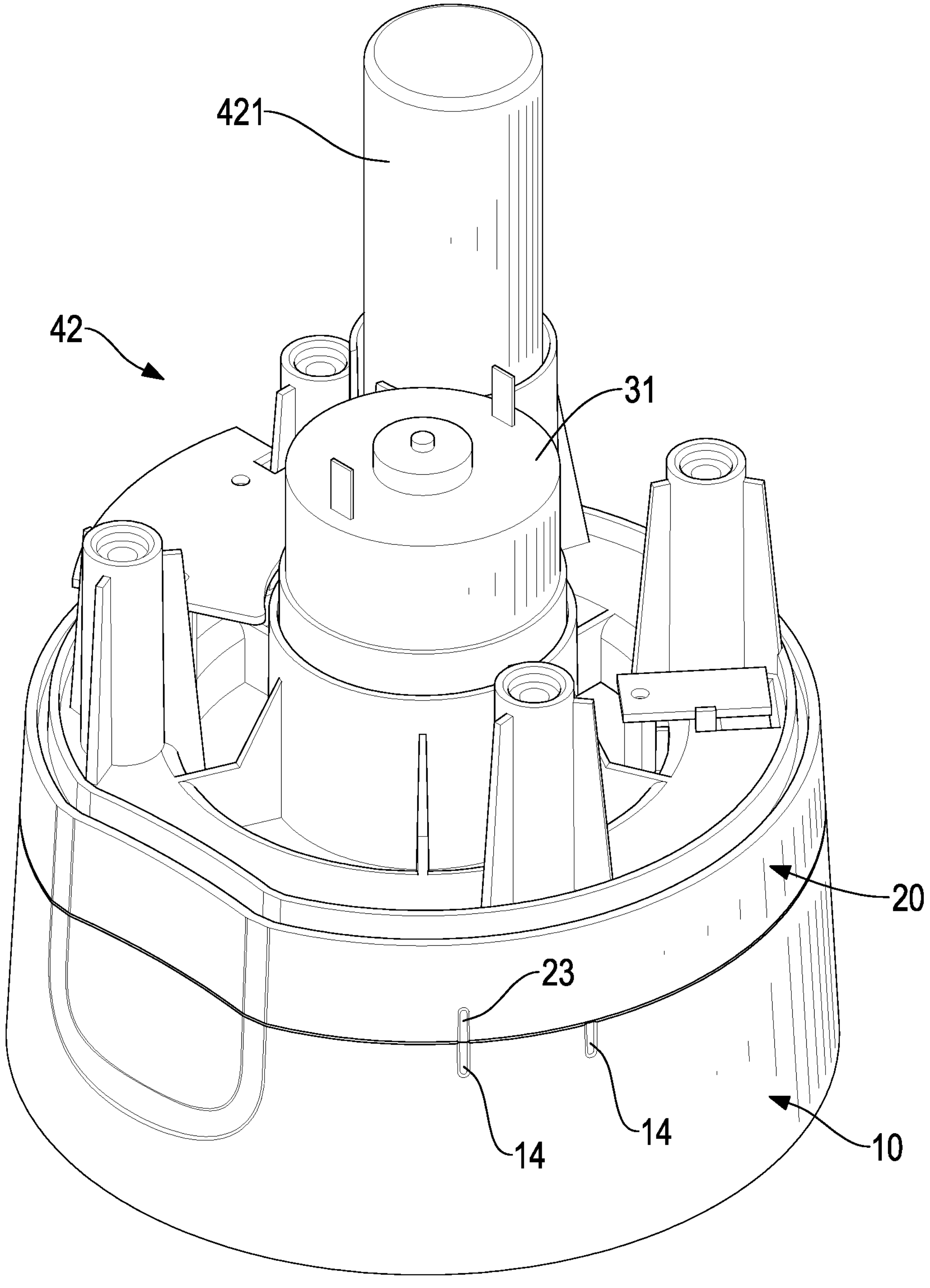
FIG. 5 a perspective view of the electric medicine grinder in FIG. 1, showing some parts being omitted.

With further reference to FIGS. 2, 3 and 5, the operating module 40 is mounted in the grinding base 20, is electrically connected with the driving motor 31, and is configured to provide electric power for operation of the driving motor 31. The operating module 40 includes a starting switch 41 and a power supply unit 42. The starting switch 41 is electrically connected to the driving motor 31 and controls the driving motor 31 to selectively drive the breaking tool 32. By pressing the starting switch 41, the driving motor 31 is switched on or off, so as to selectively drive the breaking tool 32 to rotate.

The power supply unit 42 is electrically connected to the starting switch 41 and the driving motor 31 through a circuit board 43, and includes a battery 421 and a USB (Universal Serial Bus) power supply connector 422. The battery 421 provides the electric power for the operation of the driving motor 31. Preferably, the battery 421 is a rechargeable battery. The USB power supply connector 422 is mounted on the grinding base 20 and is configured to charge the battery 421 or to directly provide the electric power for the operation of the driving motor 31. Preferably, a cover 24 is further mounted on the grinding base 20 and is configured to selectively cover the USB power supply connector 422, so as to protect the USB power supply connector 422 when the USB power supply connector 422 is not in use.

When the electric medicine grinder is in use, the user disassembles the grinding base 20 and the storing base 10 at first, puts the medicines to be ground into the storing recess 11 of storing base 10, and then assembles the grinding base 20 and the storing base 10. Afterwards, the user presses the starting switch 41 to allow the driving motor 31 to drive the breaking tool 32 to rotate, making the breaking tool 32 break the medicines in the storing recess 11 into power.

The electric medicine grinder as described has the following advantages. The medicines can be ground into the powder simply by pressing the starting switch 41, which is time and labor saving. By grinding the medicine in the storing recess 11 of the storing base 10 with the breaking tool 32, it is useful to reduce the ground medicine remaining in the storing recess 11 and on the breaking tool 32. Moreover, since the breaking tool 32 of the grinding assembly 30 is able to be disassembled from the rotating shaft 311 of the driving motor 31, in addition to facilitating the cleaning of the breaking tool 32 and avoiding the residue of the ground medicine, it is also possible to replace the breaking tool 32 according to the shape, size and hardness of the medicines to efficiently grind the medicines. Furthermore, the sealing gasket 50 not only prevents the ground medicines from entering an interior of the grinding base 20 but also prevents the ground medicines from remaining in the grinding base 20.

Since the inner container 15 that is made of stainless steel is not abraded while the medicines are being ground, no chips from the inner container 15 would pollute the ground medicines and no scratches would be formed on the inner container 15. Accordingly, no ground medicines would be remained in the scratches of the inner container 15 and pollute the subsequent medicines to be ground.

With the electric medicine grinder as described, a total amount of medicine taken by the patient is not reduced and no ground medicines would be remained in the electric medicine grinder and mix with the subsequent ground medicines to cause adverse effects to the patient.

Even though numerous characteristics and advantages of the present invention have been set forth in the foregoing description, together with details of the structure and features of the invention, the disclosure is illustrative only. Changes may be made in the details, especially in matters of shape, size, and arrangement of parts within the principles of the invention to the full extent indicated by the broad general meaning of the terms in which the appended claims are expressed.

What is claimed is:

1. An electric medicine grinder, comprising:

a storing base with an inner container, the inner container being made of stainless steel and mounted in the storing base, the storing base having
a storing recess formed in the inner container;
an inner bottom defined in the storing recess; and
a positioning protrusion formed on the inner bottom of the storing base;
a grinding base detachably mounted on a top of the storing base;
a grinding assembly mounted on the grinding base and including
a driving motor securely mounted in the grinding base and having a rotating shaft; and
a breaking tool assembled to the rotating shaft of the driving motor, mounted in the storing recess of the storing base, and having
a central shaft having a connecting end and a positioning end oppositely defined on the central shaft, and the connecting end of the central shaft connected to the rotating shaft of the driving motor, wherein a positioning recess is formed in the positioning end of the central shaft; and
multiple blades mounted on an outer annular surface of the central shaft, arranged around the central shaft, and extending radially, wherein when the grinding base and the storing base are assembled together, the positioning protrusion of the storing base protrudes in the positioning recess on the central shaft of the breaking tool; and
an operating module mounted in the grinding base, electrically connected with the driving motor, and configured to provide electric power for operation of the driving motor.

2. The electric medicine grinder as claimed in claim 1, wherein the electric medicine grinder further comprises a sealing gasket mounted on a bottom of the grinding base;
the rotating shaft of the driving motor is mounted through the sealing gasket to be connected with the breaking tool; and
when the grinding base and the storing base are assembled together, the sealing gasket seals an opening of the storing recess of the storing base.

3. The electric medicine grinder as claimed in claim 2, wherein the breaking tool is detachably assembled to the rotating shaft of the driving motor.

4. The electric medicine grinder as claimed in claim 2, wherein the operating module includes:

a starting switch electrically connected to the driving motor and controlling the driving motor to selectively drive the breaking tool; and
a power supply unit electrically connected to the starting switch and the driving motor through a circuit board.

5. The electric medicine grinder as claimed in claim 4, wherein the power supply unit includes a battery providing the electric power for the operation of the driving motor.

6. The electric medicine grinder as claimed in claim 5, wherein the power supply unit further includes a USB (Universal Serial Bus) power supply connector configured to charge the battery through the USB power supply connector or to directly provide the electric power for the operation of the driving motor.

7. The electric medicine grinder as claimed in claim 5, wherein the battery is a rechargeable battery.

8. The electric medicine grinder as claimed in claim 2, wherein the storing base has multiple engaging grooves separately formed in an outer annular surface of the storing base, and each of the engaging grooves has
an insertion section extending toward and formed through the top of the storing base;
an extension section extending parallel to the top of the storing base; and
an engaging protrusion formed in the extension section of the engaging groove; the grinding base has
a mounting recess formed in the bottom of the grinding base;
an inner annular surface defined around the mounting recess; and
multiple locking protrusions separately formed on the inner annular surface of the grinding base and movably mounted in the engaging grooves of the storing base respectively.

9. The electric medicine grinder as claimed in claim 8, wherein the storing base has two aligning notches separately formed the outer annular surface of the storing base;
the grinding base has an aligning notch formed on an outer annular surface of the grinding base;
when the locking protrusions of the grinding base are disposed in the insertion sections of the engaging grooves of the storing base respectively, the aligning notch of the grinding base aligns with one of the aligning notches of the storing base; and
when each of the locking protrusions of the grinding base is moved to an end of the extension section of a corresponding one of the engaging grooves, the aligning notch of the grinding base aligns with the other one of the aligning notches of the storing base.

10. The electric medicine grinder as claimed in claim 1, wherein the breaking tool is detachably assembled to the rotating shaft of the driving motor.

11. The electric medicine grinder as claimed in claim 1, wherein the operating module includes:

a starting switch electrically connected to the driving motor and controlling the driving motor to selectively drive the breaking tool; and a power supply unit electrically connected to the starting switch and the driving motor through a circuit board.

12. The electric medicine grinder as claimed in claim 11, wherein the power supply unit includes a battery providing the electric power for the operation of the driving motor.

13. The electric medicine grinder as claimed in claim 12, wherein the power supply unit further includes a USB (Universal Serial Bus) power supply connector configured to charge the battery through the USB power supply connector or to directly provide the electric power for the operation of the driving motor.

14. The electric medicine grinder as claimed in claim 12, wherein the battery is a rechargeable battery.

15. The electric medicine grinder as claimed in claim 1, wherein the storing base has multiple engaging grooves separately formed in an outer annular surface of the storing base, and each of the engaging grooves has an insertion section extending toward and formed through the top of the storing base;

an extension section extending parallel to the top of the storing base; and an engaging protrusion formed in the extension section of the engaging groove; the grinding base has a mounting recess formed in a bottom of the grinding base;

an inner annular surface defined around the mounting recess; and multiple locking protrusions separately formed on the inner annular surface of the grinding base and movably mounted in the engaging grooves of the storing base respectively.

16. The electric medicine grinder as claimed in claim 15, wherein the storing base has two aligning notches separately formed the outer annular surface of the storing base;

the grinding base has an aligning notch formed on an outer annular surface of the grinding base;

when the locking protrusions of the grinding base are disposed in the insertion sections of the engaging grooves of the storing base respectively, the aligning notch of the grinding base aligns with one of the aligning notches of the storing base; and when each of the locking protrusions of the grinding base is moved to an end of the extension section of a corresponding one of the engaging grooves, the aligning notch of the grinding base aligns with the other one of the aligning notches of the storing base.

* * * * *